United States Patent [19]
Mallozzi et al.

[11] 3,850,698
[45] Nov. 26, 1974

[54] ALTERING MATERIAL PROPERTIES

[75] Inventors: Philip J. Mallozzi; Barry P. Fairand, both of Columbus, Ohio

[73] Assignee: Industrial Materials, Limited, Columbus, Ohio

[22] Filed: June 23, 1972

[21] Appl. No.: 265,799

[52] U.S. Cl. .................. 148/4, 148/1, 219/121 L, 331/91.45
[51] Int. Cl. ........................ C21d 7/00, C22f 3/00
[58] Field of Search ............. 331/91.45; 219/121 L; 148/1, 4

[56] References Cited
UNITED STATES PATENTS

| | | | |
|---|---|---|---|
| 2,703,297 | 3/1955 | MacLeod | 148/4 |
| 3,172,199 | 3/1965 | Schmidt | 148/4 X |
| 3,218,199 | 11/1965 | Cowan et al. | 148/4 |
| 3,454,435 | 7/1969 | Jacobs | 148/12.7 |

OTHER PUBLICATIONS
Applied Physics Letters, Vol. 19, No. 11, Dec. 1, 1971, pgs. 473–475.
Applied Physics Letters, Vol. 19, No. 6, Sept. 15, 1971, pgs. 207 & 208.
Soviet Physics–Doklady, Vol. 14, No. 11, May 1970, pgs. 1128–1130.
Soviet Physics–Technical Physics, Vol. 12, No. 6, Dec. 1967, pgs. 753–757.

*Primary Examiner*—Charles N. Lovell
*Attorney, Agent, or Firm*—Philip M. Dunson

[57] ABSTRACT

A method of altering properties in a solid target by attaching securely to its surface a layer of solid or liquid overlay material, and directing a radiation pulse of high power density (as from a laser) to the layer. The thickness of the target plus any overlay that is absorbent to the radiation is at least about two micrometers greater than the mean free path of the radiation therein.

The target typically comprises a metal or metal compound having a thermal diffusivity of at least about 0.1 square centimeter per second. The overlay material may be either inert or exothermic, and either transparent or opaque to the radiation. Where it is opaque, it may be covered with a layer of another overlay material.

21 Claims, 3 Drawing Figures

PATENTED NOV 26 1974  3,850,698

ALTERING MATERIAL PROPERTIES

BACKGROUND OF THE INVENTION

This invention relates to the use of radiation pulses, as from high power pulsed lasers, in a new method for the shock processing of solid materials. The method is especially useful for enhancing or creating desired physical properties such as hardness, strength, corrosion resistance, etc., and the improvement of welds between metal surfaces, etc.

Old methods for the shock processing of solid materials involve the use of high explosive materials in contact with the solid, or high explosive materials are used to accelerate a plate which strikes the solid, thus shocking it. Such methods have several disadvantages. These include: (a) it is difficult and costly to shock process non-planar surfaces and complicated geometries, (b) storage and handling of the high explosive materials pose a hazard, (c) the processes are difficult to automate and thus cannot meet specific industrial needs, and (d) the high explosive materials cannot be used in extreme environments such as high temperatures and high vacuum.

The interaction of a pulsed laser beam with a material surface gives rise to a pressure pulse, i.e., shock wave, which propagates into the material and changes the material properties, or joins it with another piece of material. In the case of metal hardening, for example, these changes may appear as tangled dislocation networks which increase the strength properties of the material. By appropriate tailoring of the peak pressure and pressure pulse width, it is possible to create or enhance selected material properties, such as strength, and at the same time not deleteriously affect other pre-shocked properties, such as corrosion resistance. It is possible to shock process a finished piece part without disturbing its surface, where a thin sacrificial layer of overlay material has been attached intimately onto the surface of the workpiece.

This invention has several advantages over what has been done before. Advantages include: (a) The source is highly controllable and reproducible. (b) The source is easily focused on preselected surface areas and the operating mode is easily changed. This allows flexibility in the desired shocking pressure and careful control over the workpiece area to be shocked. (c) Workpieces immersed in hostile environments such as high temperature and high vacuum can be shock processed. (d) The workpiece can be easily repetitively shocked. This is desirable where it is possible to enhance material properties in a stepwise fashion. By shocking the workpiece several times at low pressures, gross material deformation and spallation of the workpiece are avoided. (e) The process is particularly ammenable to automation. (f) Nonplanar workpieces can be shock processed without the need of elaborate and costly shock focusing schemes.

Several publications have dealt with the creation of stress waves in solids using lasers:

1. G. A. Askar'yan and E. M. Moroz, JETP Letters 16, 1638 (1963).
2. Frank Neuman, Appl. Phys. Letters 4, 167 (1964).
3. David W. Gregg and Scott J. Thomas, J. Appl. Phys. 37, 2787 (1966).
4. C. H. Skeen and C. M. York, Appl. Phys. Letters 12, 369 (1968).
5. N. C. Anderholm, Appl. Phys. Letters 16, 113 (1970).
6. S. A. Metz and F. A. Smidt, Jr., Appl. Phys. Letters 19, 207 (1971).
7. L. C. Yang and Vincent J. Menichelli, Appl. Phys. Letters 19, 473 (1971).

The majority of these papers were concerned with the phenomenology of laser generated pressure pulses. Exceptions include an experiment where pressure pulses generated in very thin aluminum foils were used to detonate insensitive high explosives, and a study of vacancy production in thin vanadium and nickel foils, as reported in the last two papers listed above. Prior studies did not look at the possible use of pulsed lasers to significantly alter in-depth material properties such as dislocation substructures. Because of its high controllability and reproducibility, a pulsed laser provides an important new tool for studies of basic mechanisms of shock deformation of solids, as well as more practical material shock processing applications.

SUMMARY OF THE INVENTION

A typical method according to the present invention of altering properties in a solid target comprises attaching to a surface of the target a layer of solid or liquid overlay material, and directing a radiation pulse of high power density to the layer of overlay material, wherein the thickness of the target plus any overlay that is absorbent to the radiation is at least about 2 micrometers greater than the mean free path of the radiation therein. As used herein, a "layer" may include more than one stratum or thickness of the same material or of different materials.

The target typically comprises a material having a thermal diffusivity of at least about 0.1 square centimeter per second, and typically comprises at least one metal or metal compound.

The layer of overlay material should be attached securely over the surface of the target. The overlay material may be substantially transparent to the radiation; or it may be substantially opaque to the radiation. Optionally, another overlay material may be attached to the layer of substantially opaque material.

Where a substantially inert overlay material is used, it preferably has an acoustic impedance of at least about that of the target and a specific sublimation energy of less than about $5 \times 10^{10}$ ergs per gram. The overlay material may be exothermic, and typically has the property of rapidly releasing chemical energy, either by detonation or by deflagration, in response to the radiation.

In typical useful forms of the method, the target has high thermal diffusivity and is substantially opaque to the radiation, and the overlay material has low thermal diffusivity and is substantially transparent to the radiation. The overlay material may be substantially inert, or it may be exothermic.

In other typical useful forms of the method, the overlay material is substantially opaque and exothermic. In others, the overlay material is substantially opaque, has low sublimation energy, and is substantially inert. In the latter, a layer of another overlay material, having low thermal diffusivity and substantially transparent to the radiation, may be attached to the layer of overlay material on the target. The outer layer may be substantially inert, or it may be exothermic.

Various overlay materials that have proved to be useful comprise glass, quartz, sodium silicate, fused silica, potassium chloride, sodium chloride, polyethylene, a fluoroplastic; nitrocellulose or a mixture thereof: PETN (pentaerythritol tetranitrate); bismuth, lead, cadmium, tin, or zinc. A typical overlay is about 50 to 20,000 micrometers thick.

The radiation pulse typically is supplied by a laser, and the laser pulse preferably provides to the target about 10 to 10,000 Joules per square centimeter of energy density in about 10 to 10,000 nanoseconds.

DESCRIPTION OF PREFERRED EMBODIMENTS

Figure 1:
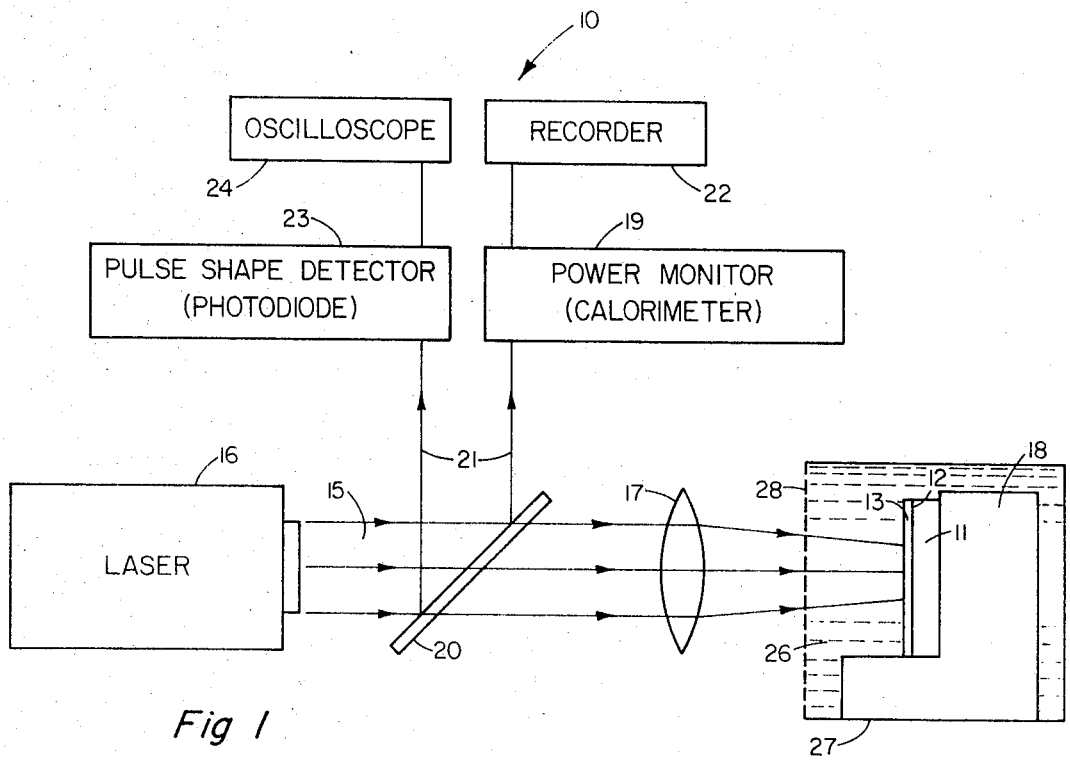
FIG. 1 is a schematic view illustrating typical embodiments of the present invention.

FIG. 1 schematically illustrates apparatus 10 suitable for practicing typical methods according to the present invention for altering properties in a solid target 11. Such methods comprise attaching to a surface 12 of the target 11 a layer 13 of solid or liquid overlay material, and directing a radiation pulse 15 of high power density to the layer 13 of overlay material, wherein the thickness of the target 12 plus any overlay 13 that is absorbent to the radiation 15 is at least about 2 micrometers greater than the mean free path of the radiation 15 therein.

The target 11 preferably comprises a material having a thermal diffusivity of at least about 0.1 square centimeter per second, and typically comprises at least one metal or metal compound. Thermal diffusivity is a thermodynamic quantity equal to the thermal conductivity of the material divided by the product of its density times its specific heat. Some typical target materials for which the present invention is especially useful are listed in Table 1 with their thermal diffusivities.

Table 1.

| Material | Thermal Diffusivity, cm²/sec |
|---|---|
| Silver | 1.67 |
| Copper | 1.14 |
| Magnesium | 0.93 |
| Aluminum | 0.76 |
| Cadmium | 0.46 |
| Zinc | 0.39 |

The layer of overlay material 13 should be attached securely over the surface 12 of the target 11 so as to be in intimate surface contact throughout the area to be radiated. Where some or all of the overlay material comprises a liquid, as at 26, it is held within an enclosure 27, of which at least the front portion 28 preferably is transparent to the radiation 15. Where a liquid overlay 26 is used, the solid overlay 13 may be omitted, if desired. Where only the solid overlay is desired, the liquid 26 and the enclosure 27 may be omitted.

Figure 2:
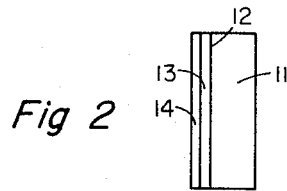
FIG. 2 is a schematic view of an alternative form of target and overlays that may be used in the embodiments of FIG. 1.

The overlay material may be substantially transparent to the radiation. Useful transparent overlay materials include glass, quartz, sodium silicate, fused silica, potassium chloride, sodium chloride, polyethylene, fluoroplastics; nitrocellulose and mixtures thereof. Fluoroplastics, as they are known by the ASTM nomenclature, are paraffinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (TFE); fluorinated ethylenepropylene (FEP); the chlorotrifluoroethylenes (CTFE); and polyvinylidine fluoride (PVF$_2$). Also available is a variety of copolymers of both halogenated and fluorinated hydrocarbons, including fluorinated elastomers.

Where desired, the overlay material may be substantially opaque to the radiation. Useful opaque overlay materials include pentaerythritol tetranitrate; bismuth, lead, cadmium, tin, zinc; and mixtures of charcoal with various transparent materials such as mixtures of nitrocellulose and potassium perchlorate or potassium nitrate. Optionally, as shown in FIG. 2, a layer of another overlay material 14 may be attached to the layer of substantially opaque material 13. The outer layer 14 may be either transparent or opaque.

Where a substantially inert overlay material is used, it preferably has an acoustic impedance of at least about that of the target and a specific sublimation energy of less than about $5 \times 10^{10}$ ergs per gram. Acoustic impedance is defined as the product of sound velocity in the material times its density. Specific sublimation energy means the energy required per unit mass to transform a material from a solid form to a gaseous form. Metals having sublimation energies in the preferred low range include bismuth, lead, cadmium, tin, and zinc.

The overlay material may be exothermic (i.e., a material that releases energy), and preferably has the property of rapidly releasing chemical energy, either by detonation or by deflagration, in response to the radiation. Detonation is a process by which a high explosive undergoes chemical reaction within a specific type of shock wave called a detonation wave whose velocity is nearly constant for a given type of high explosive. Deflagration is a process by which a material burns and releases chemical energy.

The following Table 2 lists most of the more important chemicals used in the American explosive industry. Various ingredients listed in the table can be combined in many ways to provide a range of characteristics in overlays for various needs.

Table 2.

COMMON EXPLOSIVES AND INGREDIENTS USED IN
U. S. EXPLOSIVES INDUSTRY

Primary High Explosives

| | |
|---|---|
| Mercury fulminate | Lead azide |
| Diazodinitrophenol | Lead styphnate |
| Nitromannite | |

Secondary High Explosives

| | |
|---|---|
| TNT (trinitrotoluene) | Tetryl (trinitrophenyl- |
| RDX (cyclotrimethyl- | methylnitramine) |
| enetrinitramine | NG (nitroglycerine) |
| PETN (pentaerythritol | AN (ammonium nitrate) |
| tetranitrate | Nitrostarch |
| Ammonium picrate | Picric acid |
| DNT (dinitrotoluene) | EDNA (ethylenedia- |
| | 10 minedinitrate) |

Low Explosives

| | |
|---|---|
| Black powder (potassium nitrate, sulfur, charcoal) | Smokeless powder |
| | Nitrocotton |
| Black powder (sodium nitrate sulfur, charcoal) | |

Nonexplosive Ingredients

| | |
|---|---|
| Aluminum | Waxes |
| Diphenylamine | Metal nitrates |
| Mononitrotoluene | Metals (aluminum, ferrosilicon) |
| Wood pulps, meals, other combustibles | Paraffin, other hydrocarbons |
| | Chalk, diphenylamine, wax, sulfur, carbon |

In typical useful forms of the method, the target has high thermal diffusivity and is substantially opaque to the radiation, and the overlay material has low thermal diffusivity and is substantially transparent to the radiation. The overlay material may be substantially inert, or it may be exothermic.

In other typical useful forms of the method, the overlay material is substantially opaque and exothermic. In others, the overlay material is substantially opaque, has low sublimation energy, and is substantially inert. In the latter, a layer of another overlay material, having low thermal diffusivity and substantially transparent to the radiation, may be attached to the layer of overlay material on the target. The outer layer may be substantially inert, or it may be exothermic.

Various overlay materials that have proved to be especially useful include glass, quartz, sodium silicate, fused silica, potassium chloride, sodium chloride, polyethylene, a fluoroplastic; nitrocellulose or a mixture thereof; PETN (pentaerythritol tetranitrate); bismuth, lead, cadmium, tin, or zinc. A typical overlay is about 50 to 20,000 micrometers thick.

The radiation pulse typically is supplied by a laser, and the laser pulse preferably provides to the target about 10 to 10,000 Joules per square centimeter of energy density in about 10 to 10,000 nanoseconds.

EXAMPLES

Significant changes in the in-depth microstructural and mechanical properties of a commercial 7,075 aluminum alloy were induced by stress waves created by a high power pulsed laser. Nominal composition of the 7,075 aluminum alloy in weight percent is Al—90 percent, Zn—5.6 percent, Mg—2.5 percent, Cu—1.6 percent, and Cr—0.3 percent.

A Companie Generale Electricite (CGE) VD 640 oscillator-amplifier laser system 16 was used in these examples. This laser is a very high power, Q-switched neodymium-glass system consisting of an oscillator followed by five amplifier stages. The output 15 of only four of these amplifier stages was used to generate stress waves in 7,075 alloy aluminum targets 11. The fourth amplifier stage is capable of delivering up to 180 Joules of energy in about 30 nanoseconds. The laser radiation 15 was focused onto the targets with a 100 cm focal length double-convex lens 17. The aluminum targets 11 were mounted against a 0.32 cm thick brass plate 18 and covered with a transparent overlay 13,14 (as in FIG. 2) which consisted of a layer of sodium silicate 13 and a 0.1 cm thick glass microscope slide 14 which was firmly clamped against the aluminum target. The intervening layer of sodium silicate 13 assured that the overlay 13,14 was in intimate contact with the aluminum target 11. All experiments were performed in air at room temperature and atmospheric pressure.

Figure 3:
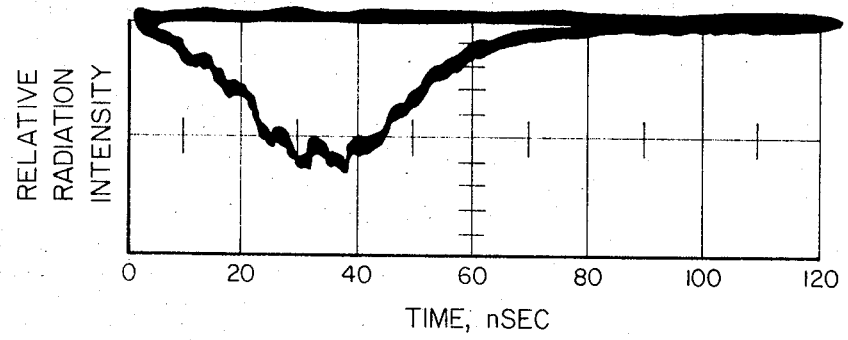
FIG. 3 is an oscilloscope trace of a typical radiation pulse from the laser in FIG. 1.

Laser power was monitored during each laser shot with a CGE carbon calorimeter 19. This calorimeter was calibrated against a similar calorimeter which was located at the position later occupied by the target 11. The procedure was to split off approximately 5 percent of the laser beam 15 via a beam splitter 20 and direct it, as indicated at 21, into the calorimeter 19, which was used to monitor the laser power during each experimental irradiation. A permanent record was made by a recorder 22 connected to the monitor 19. After calibration, the calorimeter at the target position was removed. The shape of the laser pulse was measured with a Hewlett Packard photodiode 23, which received a portion of the split-off radiation 21, and the pulse was recorded with a Tektronix 519 oscilloscope 24 connected to the pulse shape detector 23. FIG. 3 is a typical trace from the oscilloscope 24. The full width at one-half maximum is about 32 nanoseconds.

Specimens of 7,075 aluminum were shocked with the laser. These included tensile specimens having 1 cm long by 0.5 cm wide gage dimensions, and 1 cm square coupons for transmission electron microscopy studies. Identical sets of specimens were also prepared which were not laser shocked. One set of specimens from 1.35 mm thick sheet was heat treated to the T73 condition. Other specimens from 1.6 mm thick sheet were given heat treatments, the details of which are noted in Table 3. Coupons for electron microscopy were taken from this sheet.

Each of the specimens was irradiated twice, once on each surface. The procedure was to prepare one surface with the transparent overlay, pulse the sample with the laser, turn the sample over, and repeat the process. The primary reason for irradiating the sample on both surfaces was to ensure a more uniform shocking of the sample throughout its thickness. Hardness traverses across a specimen thickness after pulsing indicated a constant level of hardening throughout the 1.6 mm thick cross section.

The results of the tensile tests are given in Table 3. Here it is seen that specimens in a relatively soft condition, e.g., solution annealed and quenched, and T73 condition, were strengthened considerably by laser shocking; the yield strength was increased by about 25 percent. This shock-strengthening, which involved a slight macroscopic shape change, is the equivalent to a tensile plastic prestrain of about 5 percent.

TABLE 3.

INFLUENCE OF LASER SHOCKING ON THE ROOM TEMPERATURE MECHANICAL PROPERTIES OF 7075 ALUMINUM. STRAIN RATE = 0.01 MIN.$^{-1}$

| Condition | 0.2% Offset Yield Strength, psi | Ultimate Tensile Strength, psi | Elongation, Percent | Laser Fluence,[a] J/cm$^2$ |
|---|---|---|---|---|
| Solution treated (485°C, 1 hr) and water quenched | 36,700 | 66,000 | 35 | — |
| Solution treated (485°C, 1 hr) and water quenched; plus laser shocking[b] | 43,500 | 66,000 | 31 | 40.7 43.3 |
| T73 condition[c] | 50,000 | 74,600 | 18 | — |
| T73 condition; plus laser shocking | 64,600 | 85,200 | 13 | 53.5 72.0 |

[a]Since the specimens were irradiated on both surfaces two values for laser fluence appear for each shocked specimen. The laser fluences were corrected for transmission losses. Reflection losses were not taken into account. Based on published work, reflection losses were estimated to be about 25 percent of the incident beam, N. G. Basov, Phys. Tech. Phys., 13, 1581 (May, 1969).
[b]These specimens were refrigerated prior to laser shocking and tensile testing to avoid room temperature aging.
[c]T73 condition consisted of solution annealing ½ hr. at 465°C, water quenching, followed by aging 7 hrs. at 110°C and 9 hrs. at 175°C.

directing a laser pulse of high power density to the layer of overlay material such as to provide about 10 to 10,000 Joules per square centimeter of energy density in about 10 to 10,000 nanoseconds, wherein the thickness of the target plus any overlay that is absorbent to the laser radiation is at least about 2 micrometers greater than the mean free path of the radiation therein.

These changes in the mechanical properties can be interpreted in terms of the microstructural changes induced by laser shocking. Transmission electron micrographs were made to show the structure of the solution treated and quenched material before and after laser shocking for thin foils from the center portion of the 1.6 mm thick sheet specimens. The shocked sample was irradiated once on each surface at laser fluences of 71.9 J/cm² and 70.0 J/cm². Before shocking there were relatively few dislocations and these appeared to be pinned by the Cr-rich dispersed particles. However, after shocking there was a very dense tangled dislocation substructure. Comparison shows that the particle distribution was essentially unchanged by laser shocking, and no evidence could be found that laser pulsing fractured the particles or caused decohesion at the particle/matrix interface. The dislocation structures in the laser shocked material were similar to those obtained by Jacobs who explosively shocked 7,075 aluminum at 200 kbar. (Reported in A. J. Jacobs, Fundamental Aspects of Stress Corrosion Cracking, Nat. Assoc. of Corrosion Engrs., Houston, Texas, p. 530 (1969).) Similar structures were also observed by Ostermann after room temperature swaging 7,075 aluminum by 10 percent plastic strain. (Reported in F. Ostermann, Met. Trans., 2, 2897 (1971).)

Typical micrographs from the present examples are included in the paper "Laser Shock Induced Microstructural and Mechanical Property Changes in 7,075 Aluminum," by B. P. Fairand, B. A. Wilcox, W. J. Gallagher, and D. N. Williams, Battelle's Columbus Laboratories, Columbus, Ohio 43,201, in Journal of Applied Physics, volume 43, number 9, pages 3893–3895, Sept., 1972.

Experiments have shown that nitrocellulose-KClO₄—charcoal mixtures with thicknesses of about 250 microns enhance total laser energy deposition by a factor of about 5 to 10. Exothermic overlays with a higher percentage of KClO₄ would give a larger energy enhancement factor.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of altering properties by providing shock waves in a metallic target comprising
attaching to a surface of the target a layer of solid or liquid overlay material, and
directing a laser pulse of high power density to the layer of overlay material such as to provide about 10 to 10,000 Joules per square centimeter of energy density in about 10 to 10,000 nanoseconds, wherein the thickness of the target plus any overlay that is absorbent to the laser radiation is at least about 2 micrometers greater than the mean free path of the radiation therein.

2. A method as in claim 1, wherein the target comprises a material having a thermal diffusivity of at least about 0.1 square centimeter per second.

3. A method as in claim 1, wherein the layer of overlay material is attached securely over the surface of the target.

4. A method as in claim 1, wherein the overlay material is substantially transparent to the radiation.

5. A method as in claim 1, wherein the overlay material is substantially opaque to the radiation.

6. A method as in claim 5, wherein a layer of another overlay material is attached to the layer of substantially opaque material.

7. A method as in claim 1, wherein the overlay material is substantially inert.

8. A method as in claim 7, wherein the overlay material has an acoustic impedance of at least about that of the target.

9. A method as in claim 7, wherein the overlay material has a specific sublimation energy of less than about $5 \times 10^{10}$ ergs per gram.

10. A method as in claim 1, wherein the overlay material is exothermic.

11. A method as in claim 10, wherein the overlay material has the property of rapidly releasing chemical energy, either by detonation or by deflagration, in response to the radiation.

12. A method as in claim 1, wherein the target has high thermal diffusivity and is substantially opaque to the radiation, and the overlay material has low thermal diffusivity and is substantially transparent to the radiation.

13. A method as in claim 12, wherein the overlay material is substantially inert.

14. A method as in claim 12, wherein the overlay material is exothermic.

15. A method as in claim 5, wherein the overlay material is exothermic.

16. A method as in claim 5, wherein the overlay material has low sublimation energy and is substantially inert.

17. A method as in claim 16, wherein a layer of another overlay material, having low thermal diffusivity and substantially transparent to the radiation, is attached to the layer of overlay material on the target.

18. A method as in claim 17, wherein the outer layer is substantially inert.

19. A method as in claim 17, wherein the outer layer is exothermic.

20. A method as in claim 1, wherein the overlay material comprises glass, quartz, sodium silicate, fused silica, potassium chloride, sodium chloride, polyethylene, a fluoroplastic; nitrocellulose or a mixture thereof; pentaerythritol tetranitrate; bismuth, lead, cadmium, tin, or zinc.

21. A method as in claim 1, wherein the overlay is about 50 to 20,000 micrometers thick.

* * * * *

UNITED STATES PATENT OFFICE
CERTIFICATE OF CORRECTION

Patent No. 3,850,698                    Dated February 5, 1975

Inventor(s) Philip J. Mallozzi and Barry P. Fairand

It is certified that error appears in the above-identified patent and that said Letters Patent are hereby corrected as shown below:

Title page, left-hand column, after Assignee:

should read -- Battelle Memorial Institute
                Columbus, Ohio --

Signed and sealed this 15th day of April 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,850,698　　　　　　　　Dated November 26, 1974

Inventor(s) Philip J. Mallozzi and Barry P. Fairand

It is certified that error appears in the above-identified patent and that said Letters Patent are hereby corrected as shown below:

Column 7: lines 1-7 should be cancelled and their present content should be moved to follow column 7, line 60; thus correcting Claim 1 to read --

1. A method of altering properties by providing shock waves in a metallic target comprising
   attaching to a surface of the target a layer of solid or liquid overlay material, and
   directing a laser pulse of high power density to the layer of overlay material such as to provide about 10 to 10,000 Joules per square centimeter of energy density in about 10 to 10,000 nanoseconds,
   wherein the thickness of the target plus any overlay that is absorbent to the laser radiation is at least about 2 micrometers greater than the mean free

UNITED STATES PATENT OFFICE

CERTIFICATE OF CORRECTION

Patent No. 3,850,698     Dated November 26, 1974

Inventor(s) Philip J. Mallozzi et al.

It is certified that error appears in the above-identified patent and that said Letters Patent are hereby corrected as shown below:

path of the radiation therein. --.

Signed and Sealed this twelfth Day of July 1977

[SEAL]

Attest:

RUTH C. MASON
Attesting Officer

C. MARSHALL DANN
Commissioner of Patents and Trademarks